(12) United States Patent
Cousin et al.

(10) Patent No.: US 11,434,849 B2
(45) Date of Patent: Sep. 6, 2022

(54) TURBOFAN ENGINE COMPRISING A SERIES OF ROTARY BLADES FOR BLOCKING THE STREAM OF THE BYPASS AIR

(71) Applicant: Airbus Operations SAS, Toulouse (FR)

(72) Inventors: Antoine Cousin, L'Union (FR); Frédéric Ridray, L'Isle Jourdain (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 361 days.

(21) Appl. No.: 16/827,021

(22) Filed: Mar. 23, 2020

(65) Prior Publication Data

US 2020/0378340 A1 Dec. 3, 2020

(30) Foreign Application Priority Data

Mar. 25, 2019 (FR) ...................... 1903095

(51) Int. Cl.
*F02K 1/00* (2006.01)
*F02K 1/72* (2006.01)
*F02K 1/76* (2006.01)

(52) U.S. Cl.
CPC ................ *F02K 1/72* (2013.01); *F02K 1/763* (2013.01)

(58) Field of Classification Search
None
See application file for complete search history.

(56) References Cited

U.S. PATENT DOCUMENTS

| 2,933,890 A | 4/1960 | Morrison |
| 4,030,290 A | 6/1977 | Stachowiak |
| 2020/0240359 A1* | 7/2020 | Gardes .................... F02K 1/383 |

FOREIGN PATENT DOCUMENTS

DE 1937679 A1 2/1971

OTHER PUBLICATIONS

French Search Report; priority document.

* cited by examiner

*Primary Examiner* — Edwin Kang
(74) *Attorney, Agent, or Firm* — Greer, Burns & Crain, Ltd.

(57) ABSTRACT

A turbofan engine with a nacelle including a runner translationally mobile between advanced and back-off positions to open a window between a stream and an outside, a plurality of blades, each rotatable on the runner between retracted and deployed positions, and a maneuvering system displacing each blade and comprising, for each blade, a shaft rotatable on the runner and to which the blade is fixed, and a toothed segment on the shaft, and a toothed arc rotatable on the runner about a longitudinal axis, the tooth arc teeth meshing with the toothed segment teeth, a slip translationally mobile on the runner in a plane at right angles to the longitudinal axis between first and second positions, a connecting rod mounted articulated between the slip and the toothed arc, a rib integral to the fixed structure, and a guiding U integral to the slip and which straddles the rib.

10 Claims, 7 Drawing Sheets

TURBOFAN ENGINE COMPRISING A SERIES OF ROTARY BLADES FOR BLOCKING THE STREAM OF THE BYPASS AIR

CROSS-REFERENCES TO RELATED APPLICATIONS

This application claims the benefit of the French patent application No. 1903095 filed on Mar. 25, 2019, the entire disclosures of which are incorporated herein by way of reference.

FIELD OF THE INVENTION

The present invention relates to a turbofan engine which comprises a series of blades which are mounted to rotate to block the bypass air stream, and an aircraft comprising at least one such turbofan engine.

BACKGROUND OF THE INVENTION

An aircraft comprises a fuselage with a wing fixed on each side. Under each wing, there is suspended at least one turbofan engine. Each turbofan engine is fixed under the wing via a pylon which is fixed between the structure of the wing and the structure of the turbofan engine.

The turbofan engine comprises an engine and a nacelle which is fixed around the engine. The turbofan engine has, between the nacelle and the engine, a bypass stream in which bypass air circulates.

The nacelle comprises a plurality of thrust-reversing gates, each being rotationally mobile on the structure of the nacelle between a retracted position in which it is outside of the bypass stream and a deployed position in which it is positioned across the bypass stream in order to deflect the bypass air to a window which is in the wall of the nacelle and which is open between the bypass stream and the outside of the nacelle.

Thus, the bypass air is deflected outwards and, more specifically, towards the front of the turbine engine in order to produce a counter-thrust. In addition, the displacement of each thrust-reversing gate is produced using a connecting rod which crosses the bypass stream in retracted position and which therefore partially blocks the bypass stream.

Although the thrust-reversing gates give full satisfaction, it is desirable to find different mechanisms, in particular mechanisms that are less heavy and which offer no obstruction to the bypass air in retracted position.

SUMMARY OF THE INVENTION

One object of the present invention is to propose a turbofan engine which comprises a series of blades which are mounted to rotate to block the bypass air stream.

To this end, a turbofan engine is proposed that has a longitudinal axis and comprises an engine and a nacelle surrounding the engine which comprises a fan casing, in which a stream of bypass air is delimited between the nacelle and the engine and in which a flow of air circulates in a direction of flow, said nacelle comprising:
  a fixed structure fixed to the fan casing,
  a mobile assembly having a mobile cowl and a runner, the mobile cowl being fixed to the runner, the runner being translationally mobile on the fixed structure in a direction of translation between an advanced position in which the runner is positioned so that the mobile cowl is close to the fan casing and a back-off position in which the runner is positioned so that the mobile cowl is away from the fan casing to define between them an open window between the stream and the outside of the nacelle,
  a plurality of blades, each comprising a first end mounted to be rotationally mobile on the runner about an axis of rotation and in which the blades are angularly offset step-by-step about the longitudinal axis, in which each blade is mobile between a retracted position in which the blade is outside of the stream and a deployed position in which the blade is across the stream,
  a set of actuators ensuring the displacement of the runner between the advanced position and the back-off position, and vice versa, and
  a maneuvering system intended to displace each blade from the retracted position to the deployed position at the same time as the runner is displaced from the advanced position to the back-off position and vice versa, in which the maneuvering system comprises:
  for each blade, a shaft mounted to be rotationally mobile on the runner about an axis of rotation, and to which the blade is fixed,
  for each blade, a toothed segment fixed to the shaft and coaxial with the axis of rotation,
  a toothed arc coaxial with the longitudinal axis, mounted to be rotationally mobile on the runner about the longitudinal axis, in which the teeth of the toothed arc mesh with the teeth of each toothed segment,
  a slip mounted to be translationally mobile on the runner in a plane at right angles to the longitudinal axis between a first position corresponding to the retracted position and a second position corresponding to the deployed position,
  a connecting rod mounted articulated between the slip and the toothed arc,
  a rib integral to the fixed structure, and
  a guiding U integral to the slip and which straddles the rib, in which the rib has an appropriate form for displacing the guiding U and therefore the slip from the first position to the second position when the runner is displaced from the advanced position to the back-off position, and vice versa.

Such a turbine engine allows for a reduction of weight by replacing the thrust-reversing gates and their drive mechanisms with lighter pivoting blades with a simplified maneuvering system.

Advantageously, the turbofan engine comprises a radial guiding system which ensures a rotational guidance about the longitudinal axis of the toothed arc relative to the runner.

According to a particular embodiment, the radial guiding system comprises at least one window produced in a plane at right angles to the longitudinal axis through the toothed arc, and, for each window, at least two rollers, each being mounted to be rotationally mobile on the runner about an axis of rotation parallel to the longitudinal axis, in which each roller is mounted inside the window so that the outer edge of the window is bearing on one of the rollers and slips thereon and so that the inner edge of the window is bearing on the other roller and slips thereon.

According to a particular embodiment, the toothed arc takes the form of a crown ring, the radial guiding system comprises a plurality of outer rollers disposed along the outer edge of the crown ring and a plurality of inner rollers disposed along the inner edge of the crown ring, and each outer roller and each inner roller are mounted to be rotationally mobile on the runner, in which the outer edges of the crown ring are bearing on each outer roller and in which the inner edges of the crown ring are bearing on each inner roller and slip thereon.

According to a particular embodiment, the radial guiding system comprises at least one window produced in the runner in a plane at right angles to the longitudinal axis through a wall of the runner, and, for each window, at least two rollers, each being mounted to be rotationally mobile on the toothed arc about an axis of rotation parallel to the longitudinal axis, in which each roller is mounted inside the window so that the outer edge of the window is bearing on one of the rollers and slips thereon and so that the inner edge of the window is bearing on the other roller and slips thereon.

Advantageously, the turbofan engine comprises an axial positioning system which ensures a positioning parallel to the longitudinal axis between the toothed arc and the runner.

Advantageously, the axial positioning system comprises a plurality of front rollers disposed against a front face of the toothed arc and a plurality of rear rollers disposed against a rear face of the toothed arc, in which each front roller and each rear roller are mounted to be rotationally mobile on the runner about an axis of rotation extending radially relative to the longitudinal axis, and in which the front rollers and the rear rollers sandwich the toothed arc and roll on the respectively front and rear face of the toothed arc.

Advantageously, the axial positioning system comprises a window produced in a plane at right angles to the longitudinal axis through the toothed arc and bordered by an outer strip and an inner strip, at least one first pair of rollers which grip the inner strip and at least one second pair of rollers which grip the outer strip, in which each roller is mounted to be rotationally mobile on the runner about an axis of rotation extending radially relative to the longitudinal axis.

Advantageously, the axial positioning system comprises at least one first pair of rollers and at least one second pair of rollers, in which each roller is mounted to be rotationally mobile on the toothed arc about an axis of rotation extending radially relative to the longitudinal axis, an inner groove and an outer groove integral to the runner, each extending coaxially about the longitudinal axis, in which the opening of the inner groove is facing the opening of the outer groove, in which each groove thus comprises a front wall and a rear wall, in which the rollers are housed inside the grooves so that a first roller of the first pair is bearing on and rolls against the front wall of the inner groove, so that the second roller of the first pair is bearing on and rolls against the front wall of the outer groove, so that a first roller of the second pair is bearing on and rolls against the rear wall of the inner groove, and so that the second roller of the second pair is bearing on and rolls against the rear wall of the outer groove.

The invention also proposes an aircraft comprising at least one turbofan engine according to one of the preceding variants.

BRIEF DESCRIPTION OF THE DRAWINGS

The features of the invention mentioned above, and others, will emerge more clearly on reading the following description of an exemplary embodiment, said description being given in relation to the attached drawings, in which.

DETAILED DESCRIPTION OF THE PREFERRED EMBODIMENTS

In the following description, the terms relating to a position are taken with reference to the direction of flow of the air in a turbine engine which therefore flows from the front to the rear of the aircraft.

Figure 1:
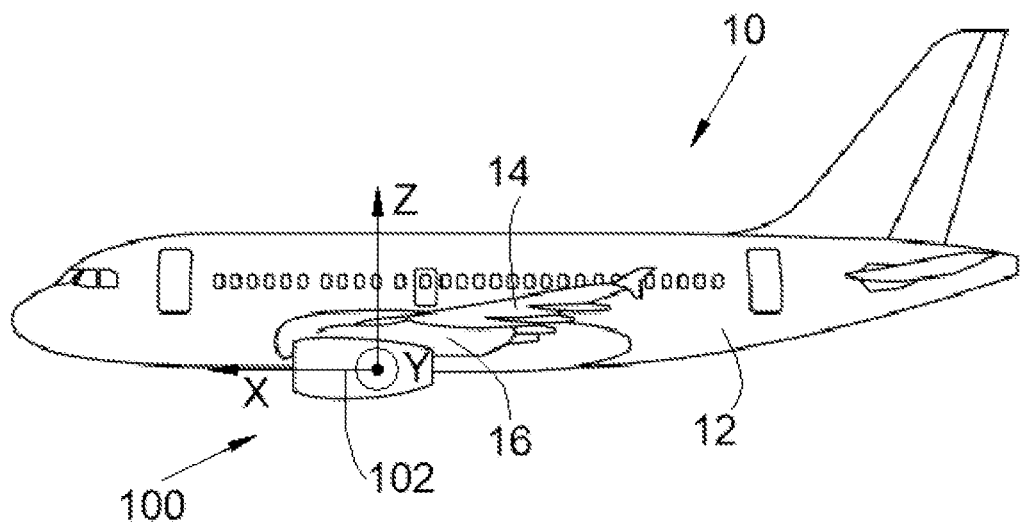
FIG. 1 is a side view of an aircraft comprising a turbofan engine according to the invention.

FIG. 1 shows an aircraft 10 which comprises a fuselage 12, on each side of which is fixed a wing 14 which bears at least one turbofan engine 100 according to the invention. The turbofan engine 100 is fixed under the wing 14 via a pylon 16.

Figure 2:
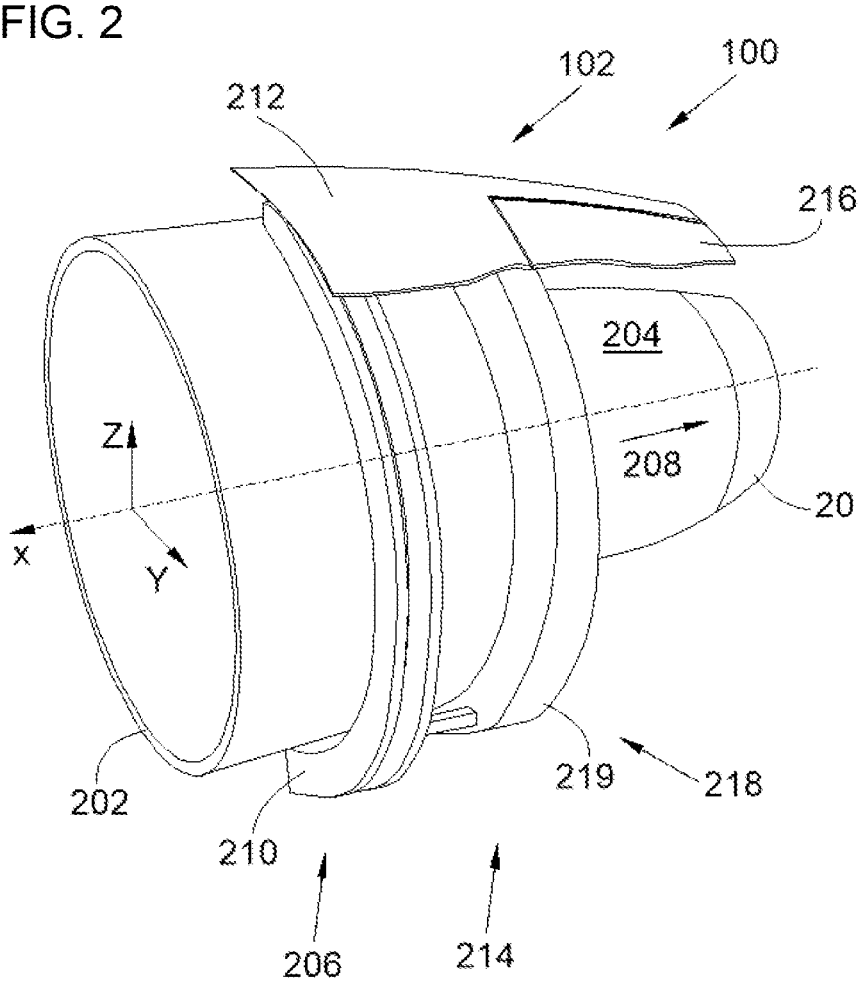
FIG. 2 is a perspective view of the turbofan engine according to the invention in advanced and retracted position.
Figure 3:
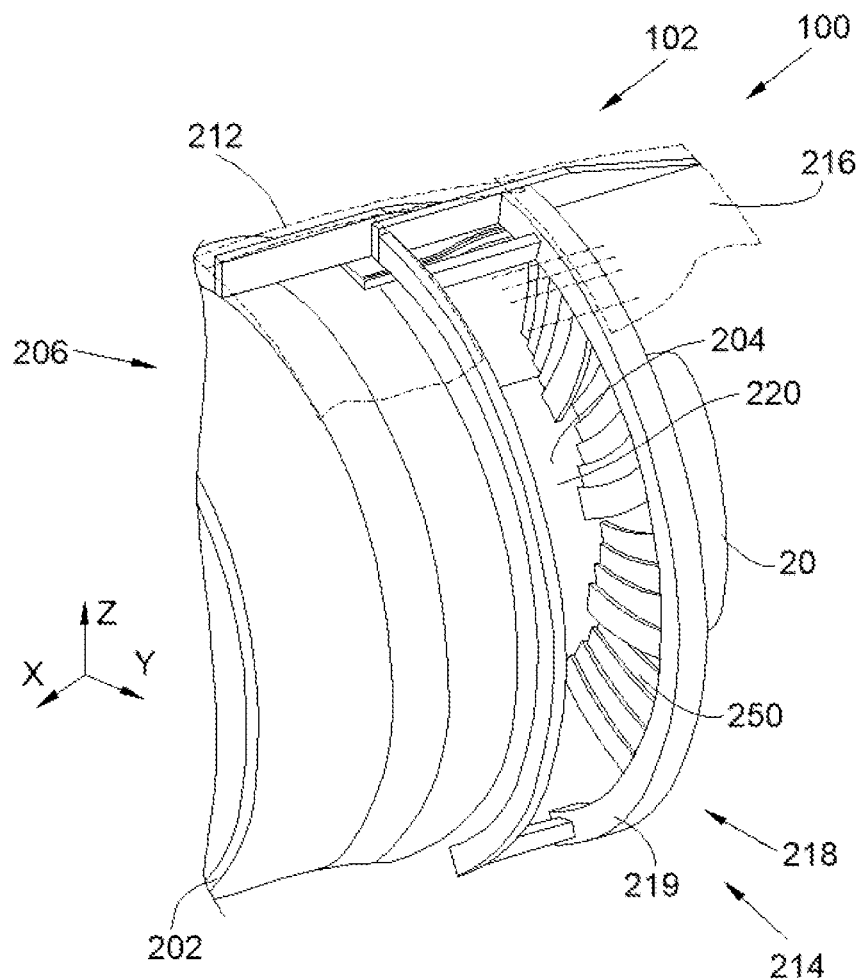
FIG. 3 is a perspective view of the turbofan engine according to the invention, in back-off and deployed position.

FIG. 2 and FIG. 3 show the turbofan engine 100 which has a nacelle 102 and an engine 20 which is housed inside the nacelle 102 and which comprises a fan casing 202. The engine 20 is embodied by its rear ejection part.

In the following description, and by convention, X denotes the longitudinal axis of the turbofan engine 100 which is parallel to the longitudinal axis of the aircraft 10 oriented positively towards the front of the aircraft 10, Y denotes the transverse axis which is horizontal when the aircraft is on the ground, and Z denotes the vertical axis, these three directions X, Y and Z being mutually orthogonal.

Figure 4:
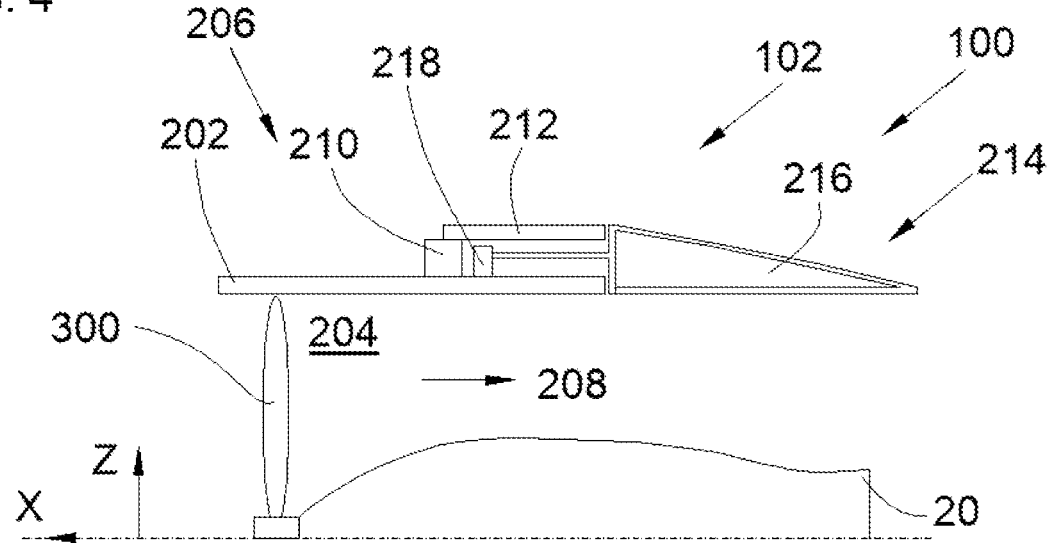
FIG. 4 is a schematic representation of a turbofan engine according to the invention seen in cross section through a vertical plane.

FIG. 2 and FIG. 3 show the turbofan engine 100 in two different positions of use and FIG. 4 shows a schematic representation in cross section of the turbofan engine 100.

The turbofan engine 100 has, between the nacelle 102 and the engine 20, a stream 204 in which circulates bypass air 208 coming from the air intake through a fan 300 and which therefore flows in the direction of flow which goes from the front to the rear.

The nacelle 102 has a fixed structure 206 which is fixedly mounted on the fan casing 202. The fixed structure 206 is composed, in particular here, of a front frame 210 mounted around the fan casing 202 and outer panels 212 forming an aerodynamic surface which are shown transparent in FIG. 3 and of which a part is cut away in FIGS. 2 and 3.

The nacelle 102 has a mobile assembly 214 which has a mobile cowl 216 (also transparent in FIG. 3) of which a part is cut away in FIGS. 2 and 3 and which forms the outer walls of the jet nozzle.

The nacelle 102 also has a runner 218. The runner 218 here takes the form of a cylinder with openwork walls. The mobile cowl 216 is fixed to and downstream of the runner 218 relative to the direction of flow of the flow of air in the turbofan engine 100.

The runner 218 is mounted to be translationally mobile in a direction of translation that is overall parallel to the longitudinal axis X on the fixed structure 206 of the nacelle 102.

The runner 218 is mobile between an advanced position (FIG. 2) and a back-off position (FIG. 3) and vice versa. In advanced position, the runner 218 is positioned as far forward as possible relative to the direction of flow so that the mobile cowl 216 is close to the outer panels 212 and the fan casing 202 and thus forms an aerodynamic surface. In back-off position, the runner 218 is positioned as far to the rear as possible relative to the direction of flow so that the mobile cowl 216 is away from the outer panels 212 and from the fan casing 202 so as to define between them a window 220.

In advanced position, the mobile cowl 216 and the outer panels 212 extend one another so as to define the outer surface of the nacelle 102, and the mobile cowl 216 and the fan casing 202 extend one another so as to define the outer surface of the stream 204.

In back-off position, the mobile cowl 216 and the fan casing 202 and the outer panels 212 are at a distance and between them define the open window 220 between the stream 204 and the outside of the nacelle 102. In other words, the air of the bypass air 208 passes through the window 220 to rejoin the outside of the turbofan engine 100.

The translation of the runner 218 is produced by any appropriate means, such as, for example, systems of slips between the fixed structure 206 and the runner 218.

The nacelle 102 also comprises a set of actuators (not represented) ensuring the translational displacement of the runner 218 between the advanced position and the back-off position and vice versa. Each actuator is controlled by a control unit, for example of processor type, which controls the displacements in one direction or in the other according to the needs of the aircraft 10.

Each actuator can, for example, take the form of a double-acting cylinder (two working directions) of which the cylinder is fixed to the fixed structure 206 and a rod is fixed to the runner 218.

In order to orient the flow of air leaving the window 220, cascades can be fixed to the runner 218 facing the window 220.

The fan casing 202 and the outer panels 212 delimit the window 220 upstream relative to the direction of flow and the mobile cowl 216 delimits the window 220 downstream relative to the direction of flow.

The nacelle 102 comprises a plurality of blades 250, each being mounted to be rotationally mobile on the runner 218 about an axis of rotation which is here overall parallel to the longitudinal axis X. Each blade 250 is thus mobile between a retracted position (FIG. 2) in which the blade 250 is outside of the stream 204 and a deployed position (FIG. 3) in which the blade 250 is across the stream 204 in order to deflect the bypass air 208 to the window 220.

Each blade 250 is mounted to be mobile at a first end while a second end approaches the engine 20 when the blade 250 is deployed in order to best block the stream 204.

The blades 250 are angularly offset step-by-step about the longitudinal axis X.

The number of blades 250 and the form of each of them depend on the dimensions of the turbofan engine 100 and on the width of each blade 250 in order for, in deployed position, the blades 250 to block most of the stream 204.

The transition from the retracted position to the deployed position is performed by a rotation of the blade 250 towards the interior of the turbine engine 100.

The retracted position can be adopted when the runner 218 is in advanced position or in back-off position. The deployed position can be adopted only when the runner 218 is in back-off position.

The runner 218 also bears a maneuvering system 400 which displaces each blade 250 from the retracted position to the deployed position at the same time as the runner 218 is displaced from the advanced position to the back-off position, and vice versa, and which is described hereinbelow.

The operation thus comprises, from the advanced/retracted position, ordering the activation of the actuators to displace the runner 218 from the advanced position to the back-off position. During this displacement, the maneuvering system 400 displaces the blades 250 from the retracted position to the deployed position.

Conversely, the operation thus comprises, from the back-off/deployed position, ordering the activation of the actuators to displace the runner 218 from the back-off position to the advanced position. During this displacement, the maneuvering system 400 displaces the blades 250 from the deployed position to the retracted position.

The use of the blades 250 mounted to rotate on the runner 218 allows for a lightening of the assembling compared to the use of thrust-reversing gates of the state of the art.

Figure 5:
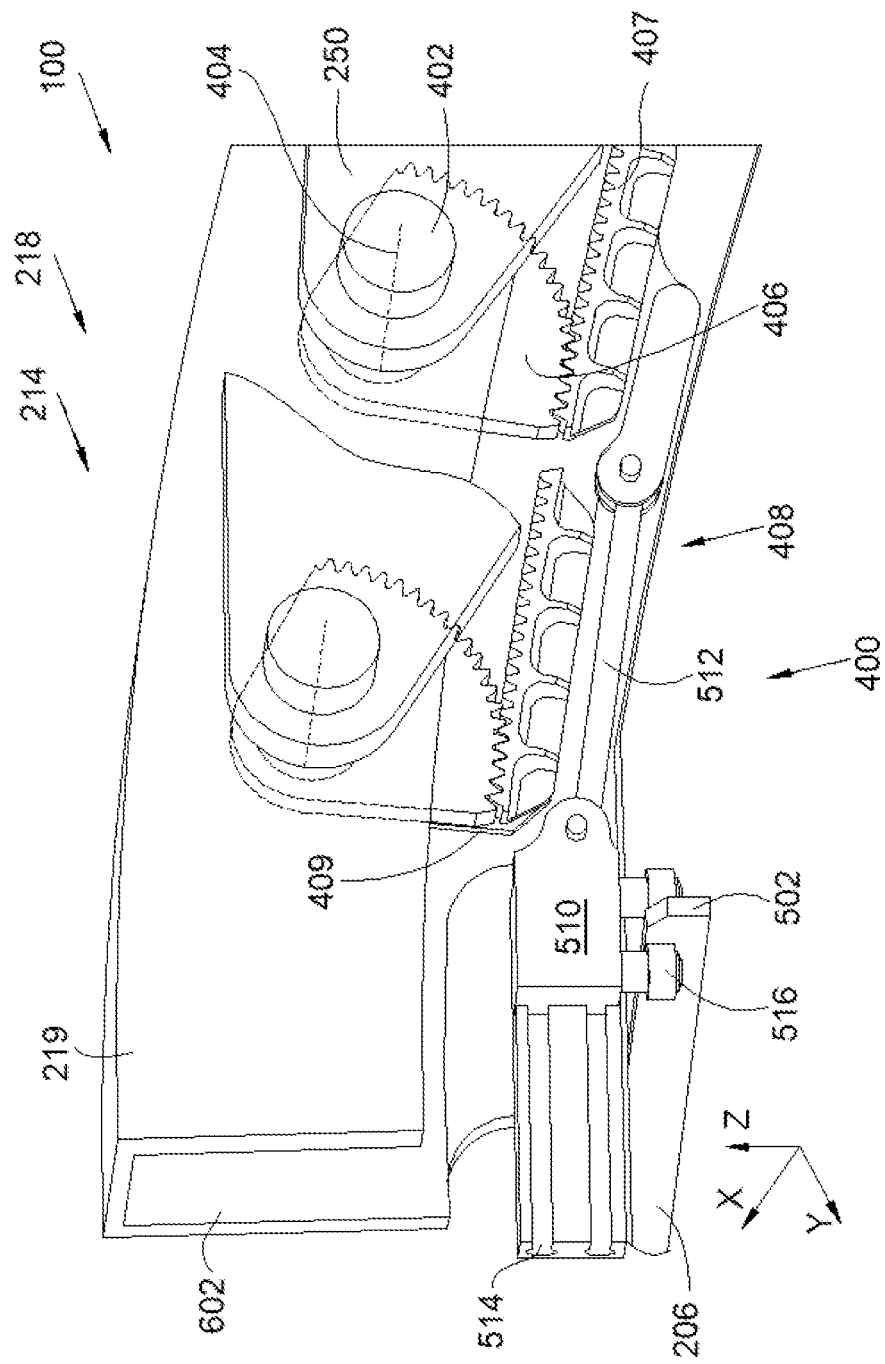
FIG. 5 is a perspective view from behind of a maneuvering system according to the invention.

FIG. 5 shows the maneuvering system 400 and FIGS. 6 to 10 show cross sections of the maneuvering system 400 according to different embodiments.

For each blade 250, the maneuvering system 400 comprises a shaft 402 which is mounted to be rotationally mobile on the runner 218 about an axis of rotation 404, and to which the blade 250 is fixed. In FIG. 5, each blade 250 is truncated to make it easier to understand the mechanism and only two blades 250 are shown.

For each blade 250, the maneuvering system 400 also comprises a toothed segment 406 fixed to the shaft 402 and coaxial with the axis of rotation 404.

The maneuvering system 400 also comprises a toothed arc 408 which is coaxial with the longitudinal axis X. The toothed arc 408 is mounted to be rotationally mobile on the mobile assembly 214 and, more particularly, on the runner 218 about the longitudinal axis X. In the embodiment of the invention presented in FIG. 5, the toothed arc 408 comprises a support plate 409 which here overall takes the form of a crown ring and, for each toothed segment 406, a toothed sub-arc 407 fixed to the support plate 409. This disposition allows for an independent setting of each toothed sub-arc 407 relative to the support plate 409, but it is also possible to provide a toothed arc which extends over all the toothed segments 406. This disposition thus allows for the use of different materials for the production of the support plate 409 and the toothed sub-arcs 407 without impacting the expansion capacity of the toothed arc 408 when it is subjected to temperature variations.

Each toothed sub-arc 407 is fixed to the support plate 409 by screwing systems.

The teeth of the toothed arc 408, here of each toothed sub-arc 407, mesh with the teeth of each toothed segment 406. Thus, a rotational displacement of the toothed arc 408 drives the rotation of each toothed segment 406 and therefore of the associated blade 250.

Each blade 250 extends in a plane that is overall at right angles to the longitudinal axis X.

Each blade 250 is mounted to be mobile on the perimeter of the runner 218. When the blades 250 are in retracted position, they are superposed along the longitudinal axis X.

The maneuvering system 400 also comprises a slip 510 which is mounted to be translationally mobile on the runner 218 in a plane at right angles to the longitudinal axis X between a first position corresponding to the retracted position and a second position corresponding to the deployed position.

The maneuvering system 400 also comprises a connecting rod 512 mounted articulated between the slip 510 and the toothed arc 408. Thus, when the slip 510 is displaced from the first position to the second position, the connecting rod 512 drives the rotation of the toothed arc 408 and therefore the rotation of each toothed segment 406 and therefore of the associated blade 250 which switches from the retracted position to the deployed position and vice versa when the slip 510 is displaced from the second position to the first position.

The translation of the slip 510 on the runner 218 is produced by guiding rails 514, here in dovetail form.

The fixed structure 206 comprises a rib 502 and the slip 510 is equipped with a guiding U 516 which straddles the rib 502. Thus, in the displacement of the runner 218 from the advanced position to the back-off position, the rib 502 has an appropriate form for displacing the guiding U 516 and therefore the slip 510 from the first position to the second position when the runner 218 is displaced from the advanced position to the back-off position, and vice versa. The guiding U 516 is produced here by two rollers.

The rib 502 thus has, for example, a first part which is rectilinear and parallel to the longitudinal axis X. This first part corresponds to a displacement of the runner 218 from the advanced position without displacement of the slip 510 which remains in the first position.

The rib 502 then has a curved part which corresponds to the arrival of the runner 218 at an intermediate position between the advanced position and the back-off position, and in which, from this intermediate position, the slip 510 is displaced to the second position.

The rib 502 has a form which is suitable for allowing the rotation of the blade 250 from the retracted position to the deployed position when the runner 218 passes from the advanced position to the back-off position. And, reciprocally, the rib 502 has a form which is suitable for allowing the rotation of the blade 250 from the deployed position to the retracted position when the runner 218 passes from the back-off position to the advanced position.

The displacement of all the blades 250 is then relatively simple to implement and it does not require actuators other than those necessary to the displacement of the runner 218.

In the embodiment of the invention presented in FIG. 5, the runner 218 comprises a U-shaped profile 219 coaxial with the longitudinal axis X and open towards the longitudinal axis X. The U-shaped profile 219 forms a cage 602 within which the toothed arc 408 and the toothed segments 406 are mounted to be rotationally mobile and outside of which the blades 250 are mounted to be rotationally mobile and in which the shafts 402 pass through a wall of the U-shaped profile 219.

FIGS. 6 to 9 show radial guiding systems 650, 750, 850 according to different embodiments. Each radial guiding system 650, 750, 850 ensures a rotational guidance about the longitudinal axis X of the toothed arc 408 relative to the runner 218, that is to say, a radial guidance relative to the longitudinal axis X, and, more particularly here, of the support plate 409 relative to a wall of the U-shaped profile 219.

Figure 6:
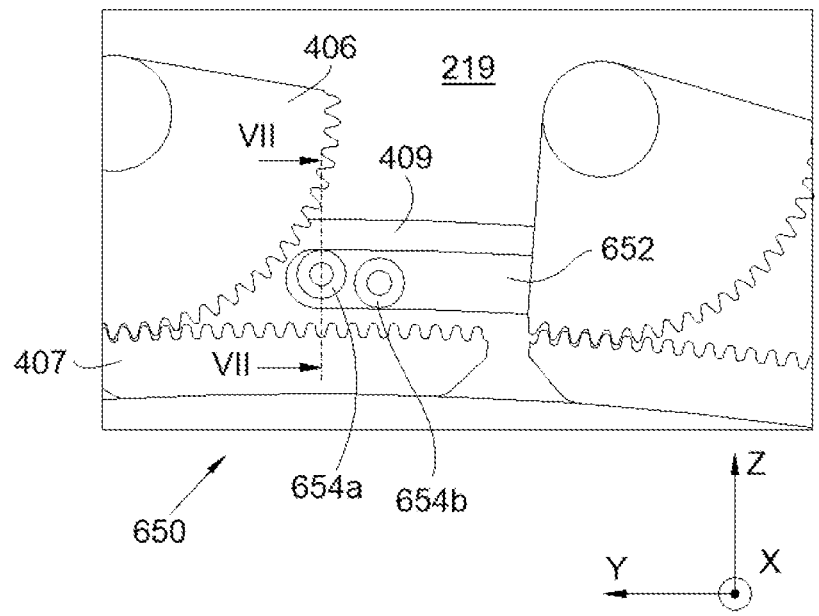
FIG. 6 is a view from behind of the maneuvering system of FIG. 5.
Figure 7:
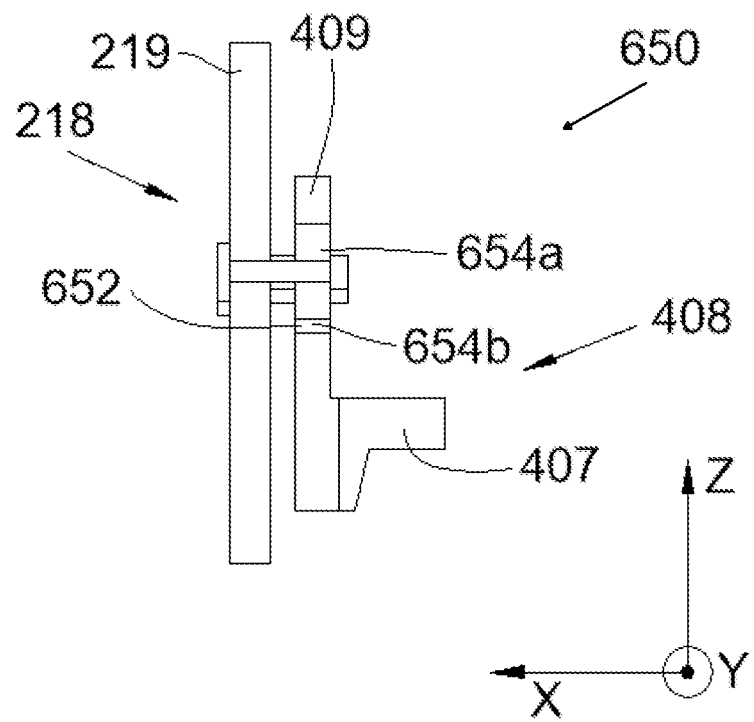
FIG. 7 is a view in cross section and from the side along the line VII-VII of FIG. 6 of a radial guiding system according to a first embodiment of the invention.

In the embodiment of FIG. 6 and of FIG. 7, the radial guiding system 650 comprises at least one window 652 produced in a plane at right angles to the longitudinal axis X through the toothed arc 408, here through the support plate 409, in which the window 652 takes an arched form that is coaxial with the longitudinal axis X. The radial guiding system 650 preferentially comprises a plurality of windows 652 distributed along the toothed arc 408 or one window 652 having a large angular aperture about the longitudinal axis X.

For each window 652, the radial guiding system 650 comprises at least two rollers 654*a-b*, each being mounted to be rotationally mobile on the runner 218, here the wall of the U-shaped profile 219, about an axis of rotation parallel to the longitudinal axis X. Each roller 654*a-b* is mounted inside the window 652 so that the outer edge of the window 652 is bearing on one of the rollers 654*a* and slips thereon and so that the inner edge of the window 652 is bearing on the other roller 654*b* and slips thereon. The inner edge of the window 652 is the edge coaxial with the longitudinal axis X and having the smallest radius, and the outer edge of the window 652 is the edge coaxial with the longitudinal axis X and having the greatest radius.

Figure 8:
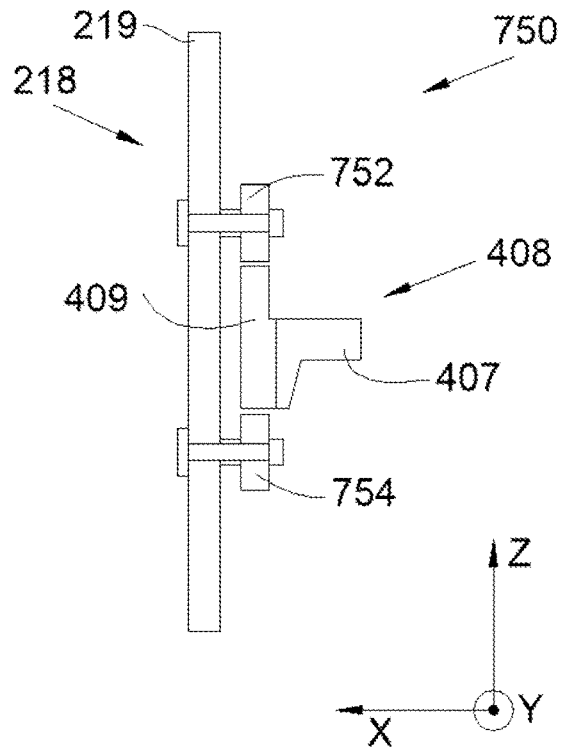
FIG. 8 is a view in cross section and from the side of a radial guiding system according to a second embodiment of the invention.

In the embodiment of FIG. 8, the radial guiding system 750 comprises a plurality of outer rollers 752 and a plurality of inner rollers 754. The toothed arc 408, here the support plate 409, takes the form of a crown ring and the outer rollers 752 are disposed along the outer edge of the crown ring and the inner rollers 754 are disposed along the inner edge of the crown ring. The outer rollers 752 and the inner rollers 754 are distributed angularly about the longitudinal axis X to be in contact at several points with the toothed arc 408.

Each outer roller 752 and each inner roller 754 are mounted to be rotationally mobile on the runner 218, here the wall of the U-shaped profile 219, about an axis of rotation parallel to the longitudinal axis X. The outer rollers 752 and the inner rollers 754 thus sandwich the crown ring, so that the outer edges of the crown ring are bearing on each outer roller 752 and the inner edges of the crown ring are bearing on each inner roller 754 and slip thereon.

Figure 9:
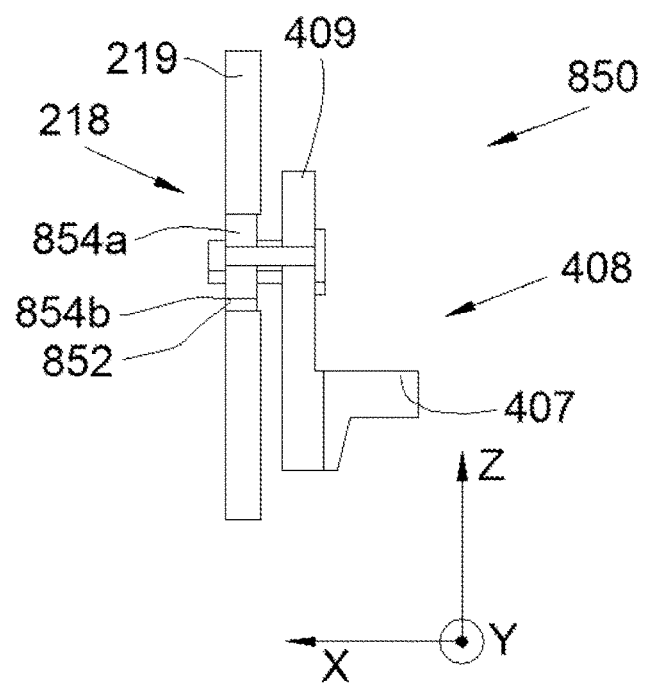
FIG. 9 is a view in cross section and from the side of a radial guiding system according to a third embodiment of the invention.

In the embodiment of FIG. 9, the radial guiding system 850 comprises at least one window 852 produced in the runner 218, here the wall of the U-shaped profile 219, in a plane at right angles to the longitudinal axis X through a wall of the runner 218, in which the window 852 takes an arched form that is coaxial with the longitudinal axis X.

The radial guiding system 850 preferentially comprises a plurality of windows 852 distributed along the runner 218 to the rear of the toothed arc 408 or one window 852 having a large angular aperture about the longitudinal axis X.

As for the embodiment of FIGS. 6 and 7, for each window 852, the radial guiding system 850 comprises at least two rollers 854*a-b*, each being mounted to be rotationally mobile on the toothed arc 408, here on the support plate 409, about an axis of rotation parallel to the longitudinal axis X. Each roller 854*a-b* is mounted inside the window 852 so that the outer edge of the window 852 is bearing on one of the rollers 854a and slips thereon and so that the inner edge of the window 852 is bearing on the other roller 854b and slips thereon.

For each of the embodiments described above, the axis of each roller 654a-b, 752, 754, 854a-b can be mounted via an eccentric system which makes it possible to set the position of said axis and thus ensure a good positioning of the roller against its rolling surface.

Figure 10:
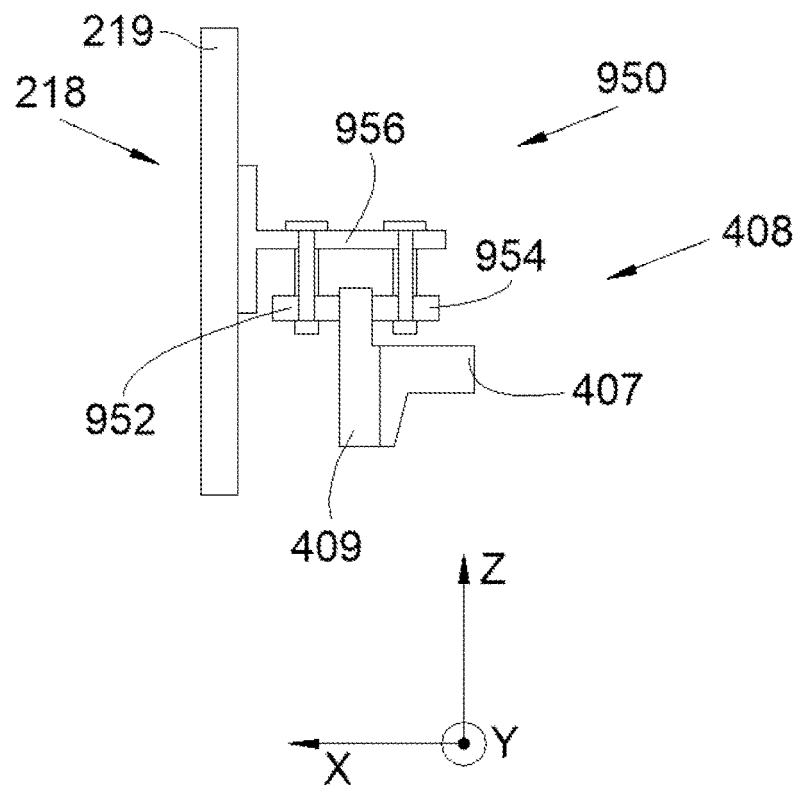
FIG. 10 is a view in cross section and from the side of an axial positioning system according to a first embodiment of the invention.

FIG. 10 shows an axial positioning system 950 according to a first embodiment which ensures a positioning parallel to the longitudinal axis X between the toothed arc 408 and the runner 218, and, more particularly here, between the support plate 409 and a wall of the U-shaped profile 219.

In the embodiment of FIG. 10, the axial positioning system 950 comprises a plurality of front rollers 952 and a plurality of rear rollers 954. Each front roller 952 is disposed against a front face of the toothed arc 408, here of the support plate 409, and each rear roller 954 is disposed against a rear face of the toothed arc 408, here of the support plate 409.

The front rollers 952 and the rear rollers 954 are distributed angularly about the longitudinal axis X to be in contact at several points with the toothed arc 408.

Preferentially, for each front roller 952, a rear roller 954 is aligned with said front roller 952 parallel to the longitudinal axis X.

Each front roller 952 and each rear roller 954 are mounted to be rotationally mobile on the runner 218, here the wall of the U-shaped profile 219, about an axis of rotation extending radially relative to the longitudinal axis X.

The front rollers 952 and the rear rollers 954 thus sandwich the toothed arc 408, so that each front roller 952 and each rear roller 954 roll respectively on the front and rear face of the toothed arc 408 in the rotation thereof In the embodiment of FIG. 10, the axis of each roller 952, 954 is mounted on a beam 956 which is itself fixed to the runner 218.

The axis of each front roller 952 and rear roller 954 can be mounted via an eccentric system which makes it possible to set the position of said axis and thus ensure a good positioning of the roller against its rolling surface.

Figure 11:
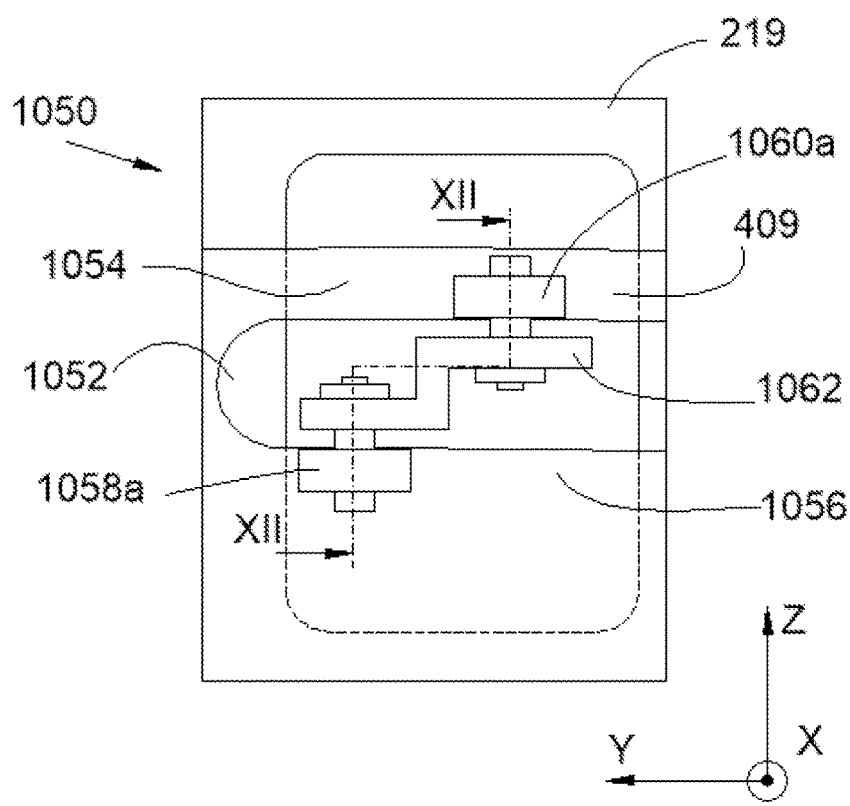
FIG. 11 is a view from behind of an axial positioning system according to a second embodiment of the invention.
Figure 12:
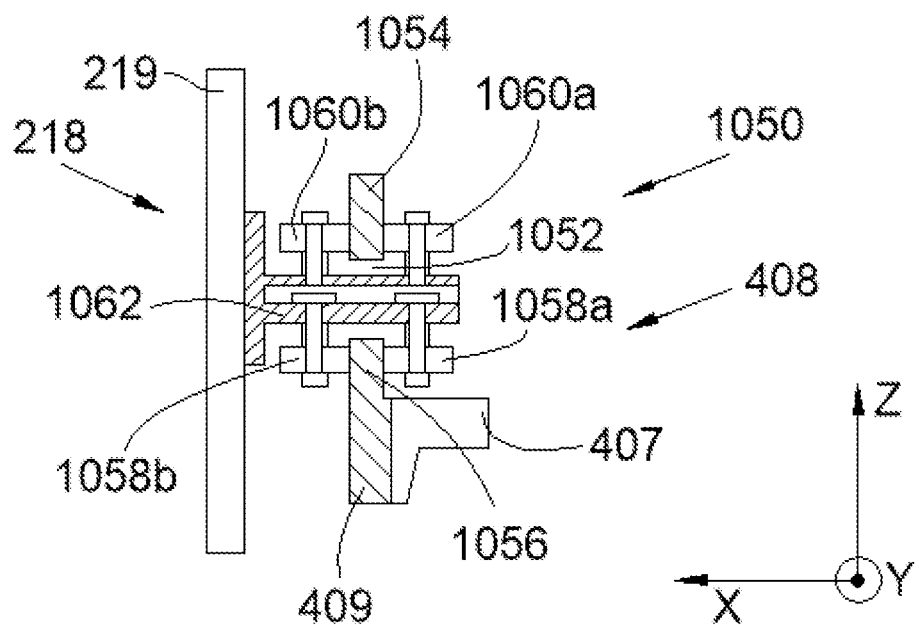
FIG. 12 is a view in cross section and from the side along the line XII-XII of FIG. 11 of the axial positioning system according to the second embodiment.

FIG. 11 and FIG. 12 show an axial positioning system 1050 according to a second embodiment which ensures a positioning parallel to the longitudinal axis X between the toothed arc 408 and the runner 218, and, more particularly here, between the support plate 409 and a wall of the U-shaped profile 219.

In the second embodiment, the toothed arc 408, here of the support plate 409, has at least one window 1052 produced in a plane at right angles to the longitudinal axis X through the toothed arc 408, here through the support plate 409. The window 1052 is bordered by an outer strip 1054 and an inner strip 1056 which are produced in the support plate 409. The outer strip 1054 extends beyond the window 1052 relative to the longitudinal axis X and the inner strip 1056 extends short of the window 1052 relative to the longitudinal axis X.

The axial positioning system 1050 also comprises at least one first pair of rollers 1058a-b which grip the inner strip 1056 and at least one second pair of rollers 1060a-b which grip the outer strip 1054.

One of the rollers 1058b of the first pair is disposed against a front face of the inner strip 1056 and the other roller 1058a of the first pair is disposed against a rear face of the inner strip 1056.

Likewise, one of the rollers 1060b of the second pair is disposed against a front face of the outer strip 1054 and the other roller 1060a of the second pair is disposed against a rear face of the outer strip 1054.

The axial positioning system 1050 can have several windows 1052 distributed along the toothed arc 408 and the window 1052 preferentially has an arched form coaxial with the longitudinal axis X.

There can be several first pairs of rollers 1058a-b and second pairs of rollers 1060a-b distributed angularly about the longitudinal axis X to be in contact at several points with the toothed arc 408.

Preferentially, the two rollers 1058a-b, 1060a-b of the same pair are aligned parallel to the longitudinal axis X.

Each roller 1058a-b, 1060a-b is mounted to be rotationally mobile on the runner 218, here via a beam 1062 integral to the wall of the U-shaped profile 219, about an axis of rotation extending radially relative to the longitudinal axis X.

The rollers 1058a-b, 1060a-b of one and the same pair thus sandwich the toothed arc 408, so that each roller 1058a-b, 1060a-b rolls on a face of the toothed arc 408 in the rotation thereof The axis of each roller 1058a-b, 1060a-b can be mounted via an eccentric system which makes it possible to set the position of said axis and thus ensure a good positioning of the roller against its rolling surface.

Figure 13:
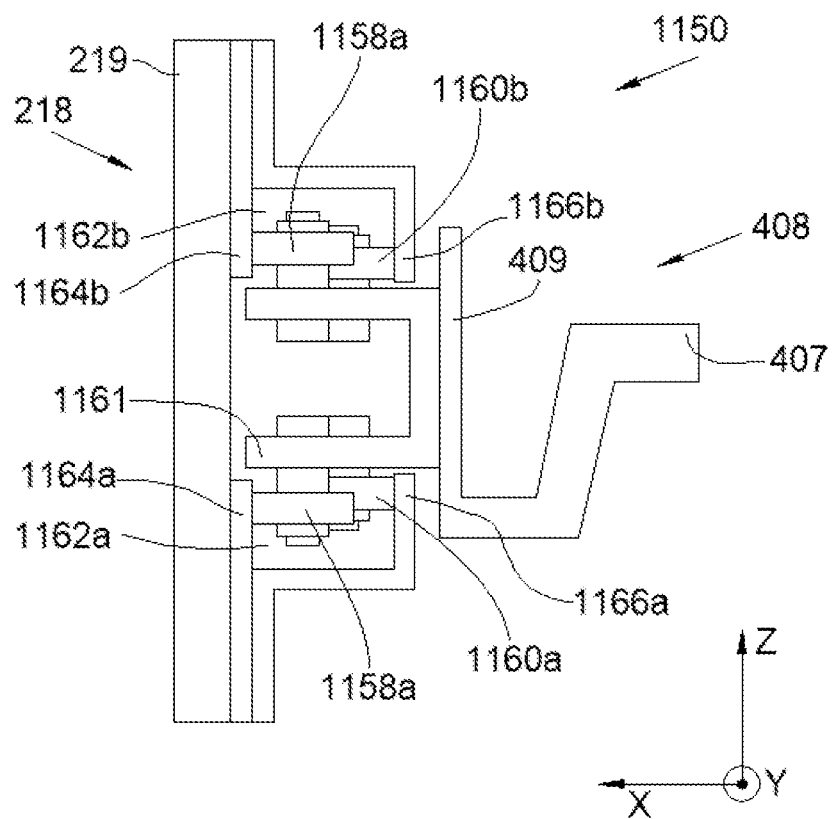
FIG. 13 is a view in cross section and from the side of an axial positioning system according to a third embodiment.

FIG. 13 shows an axial positioning system 1150 according to a third embodiment which ensures a positioning parallel to the longitudinal axis X between the toothed arc 408 and the runner 218, and, more particularly here, between the support plate 409 and a wall of the U-shaped profile 219.

In the third embodiment, the toothed arc 408, here the support plate 409, bears at least one first pair of rollers 1158a-b and at least one second pair of rollers 1160a-b. In the embodiment of the invention presented in FIG. 13, the first pair is in the plane of the leaf and the second pair is to the rear of the plane of the leaf, that is to say, they are offset like the pairs of the second embodiment of FIG. 11.

Each roller 1158a-b, 1160a-b is mounted to be rotationally mobile on the toothed arc 408, here via a beam 1161 that is integral to the support plate 409, about an axis of rotation extending radially relative to the longitudinal axis X.

The runner 218 comprises an inner groove 1162a and an outer groove 1162b which extend coaxially about the longitudinal axis X. The inner groove 1162a extends short of the outer groove 1162b relative to the longitudinal axis X and the opening of the inner groove 1162a is facing the opening of the outer groove 1162b.

Each groove 1162a-b thus comprises a front wall 1164a-b and a rear wall 1166a-b which are integral to the runner 218, here the support plate 219. In the embodiment of the invention presented in FIG. 13, each front wall 1164a-b is produced by a wall fixed to the support plate 219 and each rear wall 1166a-b is produced by an angle iron fixed to the support plate 219.

The rollers 1158a-b, 1160a-b are housed inside grooves 1162a-b so that a first roller 1158a of the first pair is bearing on and rolls against the front wall 1164a of the inner groove 1162a, so that the second roller 1158b of the first pair is bearing on and rolls against the front wall 1164b of the outer groove 1162b, so that a first roller 1160a of the second pair is bearing on and rolls against the rear wall 1166a of the inner groove 1162a, and so that the second roller 1160b of the second pair is bearing on and rolls against the rear wall 1166b of the outer groove 1162b.

There can be several first pairs of rollers 1158a-b and second pairs of rollers 1160a-b distributed angularly about the longitudinal axis X to be in contact at several points with the toothed arc 408.

Preferentially, the two rollers 1158a-b, 1160a-b of the same pair are aligned parallel to the longitudinal axis X.

The axis of each roller 1158a-b, 1160a-b can be mounted via an eccentric system which makes it possible to set the position of said axis and thus ensure a good positioning of the roller against its rolling surface.

The invention has been more particularly described in the case of a nacelle under a wing but it can be applied to a nacelle situated to the rear of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan engine having a longitudinal axis and comprising an engine and a nacelle surrounding the engine which comprises a fan casing, in which a stream of bypass air is delimited between the nacelle and the engine and in which a flow of air circulates in a direction of flow, said nacelle comprising:
    a fixed structure fixed to the fan casing,
    a mobile assembly having a mobile cowl and a runner, the mobile cowl being fixed to the runner, the runner being translationally mobile on the fixed structure in a direction of translation between an advanced position in which the runner is positioned so that the mobile cowl is close to the fan casing and a back-off position in which the runner is positioned so that the mobile cowl is away from the fan casing to define between them a window that is open between the stream and the outside of the nacelle,
    a plurality of blades, each comprising a first end mounted to be rotationally mobile on the runner about an axis of rotation and in which the plurality of blades are angularly offset step-by-step about the longitudinal axis, in which each blade is mobile between a retracted position in which each blade is outside of the stream and a deployed position in which each blade is across the stream,
    a set of actuators ensuring a displacement of the runner between the advanced position and the back-off position, and vice versa, and
    a maneuvering system configured to displace each blade from the retracted position to the deployed position at the same time as the runner is displaced from the advanced position to the back-off position and vice versa, in which the maneuvering system comprises:
    for each blade, a shaft mounted to be rotationally mobile on the runner about the axis of rotation, and to which each blade is fixed,
    for each blade, a toothed segment fixed to the shaft and coaxial with the axis of rotation,
    a toothed arc coaxial with the longitudinal axis, mounted to be rotationally mobile on the runner about the longitudinal axis, in which teeth of the toothed arc mesh with teeth of each toothed segment,
    a slip mounted to be translationally mobile on the runner in a plane at right angles to the longitudinal axis between a first position corresponding to the retracted position and a second position corresponding to the deployed position,
    a connecting rod mounted articulated between the slip and the toothed arc,
    a rib integral to the fixed structure, and
    a guiding U integral to the slip and which straddles the rib, wherein the rib has an appropriate form for displacing the guiding U and therefore the slip from the first position to the second position when the runner is displaced from the advanced position to the back-off position, and vice versa.

2. The turbofan engine according to claim 1, further comprising a radial guiding system which ensures a rotational guidance about the longitudinal axis of the toothed arc relative to the runner.

3. The turbofan engine according to claim 2, wherein the radial guiding system comprises at least one window produced in a plane at right angles to the longitudinal axis through the toothed arc and, for each window, at least two rollers, each being mounted to be rotationally mobile on the runner about an axis of rotation parallel to the longitudinal axis, in which each roller is mounted inside each window so that an outer edge of each window is bearing on a first of the at least two rollers and slips thereon and so that an inner edge of each window is bearing on a second of the at least two rollers and slips thereon.

4. The turbofan engine according to claim 2, wherein the toothed arc takes the form of a crown ring, in that the radial guiding system comprises a plurality of outer rollers disposed along an outer edge of the crown ring and a plurality of inner rollers disposed along an inner edge of the crown ring, and wherein each outer roller and each inner roller are mounted to be rotationally mobile on the runner, in which the outer edges edge of the crown ring is bearing on each outer roller and in which the inner edges edge of the crown ring is bearing on each inner roller and slip thereon.

5. The turbofan engine according to claim 2, wherein the radial guiding system comprises at least one window produced in the runner in a plane at right angles to the longitudinal axis through a wall of the runner, and, for each window, at least two rollers, each being mounted to be rotationally mobile on the toothed arc about an axis of rotation parallel to the longitudinal axis, wherein each roller is mounted inside each window so that an outer edge of each window is bearing on a first of the at least two rollers and slips thereon and so that an inner edge of each window is bearing on a second of the at least two rollers and slips thereon.

6. The turbofan engine according to claim 1, further comprising an axial positioning system which ensures a positioning parallel to the longitudinal axis between the toothed arc and the runner.

7. The turbofan engine according to claim 6, wherein the axial positioning system comprises a plurality of front rollers disposed against a front face of the toothed arc and a plurality of rear rollers disposed against a rear face of the toothed arc, wherein each front roller and each rear roller are mounted to be rotationally mobile on the runner about an axis of rotation extending radially relative to the longitudinal axis, and wherein the front rollers and the rear rollers sandwich the toothed arc and roll on the respectively front and rear face of the toothed arc.

8. The turbofan engine according to claim 6, wherein the axial positioning system comprises a window produced in a plane at right angles to the longitudinal axis through the toothed arc and bordered by an outer strip and an inner strip, at least one first pair of rollers which grip the inner strip and at least one second pair of rollers which grip the outer strip, in which each roller of the at least one first pair of rollers and of the at least one second pair of rollers is mounted to be rotationally mobile on the runner about an axis of rotation extending radially relative to the longitudinal axis.

9. The turbofan engine according to claim 6,
wherein the axial positioning system comprises at least one first pair of rollers and at least one second pair of rollers,
wherein each roller of the at least one first pair of rollers and of the at least one second pair of rollers is mounted to be rotationally mobile on the toothed arc about an axis of rotation extending radially relative to the longitudinal axis, an inner groove and an outer groove integral to the runner, each extending coaxially about the longitudinal axis,
wherein an opening of the inner groove is facing an opening of the outer groove,
wherein each groove of the inner groove and of the outer groove thus comprises a front wall and a rear wall,
wherein each roller of the at least one first pair of rollers and of the at least one second pair of rollers is housed inside each groove of the inner groove and of the outer groove so that a first roller of the at least one first pair of rollers is bearing on and rolls against the front wall of the inner groove,
so that the second roller of the at least one first pair of rollers is bearing on and rolls against the front wall of the outer groove,
so that a first roller of the at least one second pair of rollers is bearing on and rolls against the rear wall of the inner groove, and
so that the second roller of the at least one second pair of rollers is bearing on and rolls against the rear wall of the outer groove.

10. An aircraft comprising at least one turbofan engine according to claim 1.

* * * * *